US012767843B2

(12) United States Patent
Qu et al.

(10) Patent No.: US 12,767,843 B2
(45) Date of Patent: Oct. 20, 2026

(54) INKJET INK, USES THEREOF AND RELATED COMPOSITIONS, FABRICS, METHOD AND SYSTEMS

(71) Applicant: GUANGZHOU JINGYILVFANG TECHNOLOGY CO., LTD, Guangzhou City (CN)

(72) Inventors: Xinlou Qu, Guangzhou City (CN); Yong Deng, Guangzhou City (CN); Wenjie Fang, Guangzhou City (CN); Zhipeng Zhong, Guangzhou City (CN); Bei Li, Guangzhou City (CN)

(73) Assignee: GUANGZHOU JINGYILVFANG TECHNOLOGY CO., LTD, Guangzhou City (CN)

( * ) Notice: Subject to any disclaimer, the term of this patent is extended or adjusted under 35 U.S.C. 154(b) by 867 days.

(21) Appl. No.: 18/057,521

(22) Filed: Nov. 21, 2022

(65) Prior Publication Data

US 2023/0159780 A1 May 25, 2023

(30) Foreign Application Priority Data

Nov. 22, 2021 (CN) ......................... 202111386094.7

(51) Int. Cl.

| | |
|---|---|
| ***C09D 11/38*** | (2014.01) |
| ***C09D 11/102*** | (2014.01) |
| ***C09D 11/328*** | (2014.01) |
| ***D06P 1/38*** | (2006.01) |
| ***D06P 1/613*** | (2006.01) |
| ***D06P 1/647*** | (2006.01) |
| ***D06P 1/651*** | (2006.01) |
| ***D06P 5/30*** | (2006.01) |

(52) U.S. Cl.

CPC ............ *C09D 11/38* (2013.01); *C09D 11/102* (2013.01); *C09D 11/328* (2013.01); *D06P 1/38* (2013.01); *D06P 1/6133* (2013.01); *D06P 1/647* (2013.01); *D06P 1/65118* (2013.01); *D06P 5/30* (2013.01)

(58) Field of Classification Search

CPC ..... C09D 11/38; C09D 11/102; C09D 11/328; D06P 1/38; D06P 1/6133; D06P 1/647; D06P 1/65118; D06P 5/30

See application file for complete search history.

(56) References Cited

U.S. PATENT DOCUMENTS 3,416,878 A 12/1968 Hermann
5,250,121 A * 10/1993 Yamamoto ................ D06P 5/30 106/31.47
5,328,935 A * 7/1994 Van Phan ............... A61L 15/60 521/64
5,542,972 A * 8/1996 von der Eltz ........... C09B 62/04 106/31.47
6,432,186 B1 * 8/2002 Taniguchi ........... D06P 1/65118 106/31.43
10,093,816 B2 * 10/2018 Chen ..................... C09B 62/046
2003/0015120 A1 * 1/2003 Adamic ................. C09D 11/32 106/31.27
2007/0149632 A1 * 6/2007 Haider .................... C07C 43/11 568/679
2016/0326384 A1 11/2016 Chen et al.
2017/0226361 A1 8/2017 Lu et al.
2018/0371280 A1 * 12/2018 Garzon ................ B41M 5/0023
2022/0033666 A1 2/2022 Okada et al.
2023/0399795 A1 12/2023 Fang

FOREIGN PATENT DOCUMENTS

CN 1584196 A 2/2005
CN 101608406 A 12/2009
CN 103469618 A 12/2013
CN 104098954 A 10/2014
CN 104562802 A 4/2015
CN 106930118 A 7/2017
CN 108070300 A 5/2018
CN 109235088 A 1/2019
CN 109505158 A 3/2019
CN 110437675 A 11/2019
CN 110719977 A 1/2020
CN 112593426 A 4/2021

(Continued)

OTHER PUBLICATIONS

Odian, G., "Principles of Polymerization", Third Ed., John Wiley & Sons, Inc., 1991, pp. 19-24.*

Liu, J. et al., "Dyeing of soybean protein/flax blended yarns with reactive dyes and subsequent dye-fixation." Scientific Reports, 12:1506 (2022), 12 pages.

Nadabo, N. A., "Synthesis and Characterization of Some Mono Chloro-S- Triazine Vinyl Sulphone Reactive Dyes," ChemSearch Journal 5(1): 21-26, 2014.

Wikipedia. "Acidity Regulator". 2022 [Cited Nov. 2, 20221]. Available from https://en.wikipedia.org/wiki/Acidity_regulator. Downloaded from The Wayback Machine for Nov. 20, 2022.

(Continued)

*Primary Examiner* — Patrick D Niland

(74) *Attorney, Agent, or Firm* — Steinfl + Bruno LLP

(57) ABSTRACT

An inkjet ink, a method for preparing the same and use thereof are described. The inkjet ink includes the following components in mass percentage: 5%-15% of a reactive dye, 15%-40% of a polyol, 2%-35% of an auxiliary agent, and remaining amount of water, wherein the reactive dye is selected from at least one of a dye with bifunctional reactive groups and a dye with trifunctional reactive groups. The described reactive dye in the inkjet ink has high reactivity, can react with a fabric and firmly adhere to the fabric, with the color fixation rate as high as 90-95%, good color fastness, less unfixed dye, and good storage stability. The described inkjet ink only needs to be washed with cold water or warm water to remove a primer during post-processing, and the washing period is short, and it can meet the requirements of clothing use even without washing by water.

12 Claims, 5 Drawing Sheets

(56) References Cited

FOREIGN PATENT DOCUMENTS

| | | | |
|---|---|---|---|
| CN | 113668266 | A | 11/2021 |
| WO | 2014/202223 | A2 | 12/2014 |

OTHER PUBLICATIONS

Wikipedia. "Antimicrobial". 2022 [Cited Nov. 21, 2022]. Available from https://en.wikipedia.org/wiki/Antimicrobial. Downloaded from The Wayback Machine for Nov. 22, 2022.
Wikipedia. "Chelation" 2022 [Cited Nov. 21, 2022]. Available from https://en.wikipedia.org/wiki/Chelation. Downloaded from The Wayback Machine for Nov. 21, 2022.
Wikipedia. "Defoamer". 2022 [Cited Nov. 21, 2022]. Available from en.wikipedia.org/wiki/Defoamer. Downloaded from The Wayback Machine for Nov. 19, 2022.
Wikipedia. "Dye". 2022 [Cited Nov. 21, 2022]. Available from https://en.wikipedia.org/wiki/Dye. Downloaded from The Wayback Machine for Dec. 1, 2022.
Wikipedia. "Dyeing". 2022 [Cited Nov. 21, 2022]. Available from https://en.wikipedia.org/wiki/Dyeing. Downloaded from The Wayback Machine for Oct. 1, 2022.
Wikipedia. "Ink". 2022 [Cited Nov. 21, 2022]. Available from https://en.wikipedia.org/wiki/Ink. Downloaded from The Wayback Machine for Nov. 29, 2022.
Wikipedia. "Solvent". 2022 [Cited Nov. 21, 2022]. Available from https://en.wikipedia.org/wiki/Solvent. Downloaded from The Wayback Machine for Nov. 20, 2022.
Wikipedia. "Pigment". 2022 [Cited Nov. 21, 2022]. Available from https://en.wikipedia.org/wiki/Pigment. Downloaded from The Wayback Machine for Dec. 5, 2022.
Wikipedia. "Polyol". 2022 [Cited Nov. 21, 2022]. Available from https://en.wikipedia.org/wiki/Polyol. Downloaded from The Wayback Machine for Jan. 14, 2023.
Wikipedia. "Reactive Dye". 2022 [Cited Nov. 21, 2022]. Available from https://en.wikipedia.org/wiki/Reactive_dye. Downloaded from The Wayback Machine for Sep. 7, 2022.
Wikipedia. "Textile". 2022 [Cited Nov. 21, 2022]. Available from https://en.wikipedia.org/wiki/Textile. Downloaded from The Wayback Machine for Nov. 23, 2022.
Wikipedia. "Textile Printing". 2022 [Cited Nov. 21, 2022]. Available from https://en.wikipedia.org/wiki/Textile_printing. Downloaded from The Wayback Machine for Nov. 6, 2022.
Wikipedia. "Wetting". 2022 [Cited Nov. 21, 2022]. Available from https://en.wikipedia.org/wiki/Wetting. Downloaded from The Wayback Machine for Nov. 9, 2022.
Non-Final Office Action issued for U.S. Appl. No. 18/332,592, filed Jun. 9, 2023, on behalf of Guangzhou Xunjie Digital Technology Co., Ltd. et al. Mail Date: Feb. 14, 2025. 14 pages.
Notice of Allowance issued for U.S. Appl. No. 18/332,592, filed Jun. 9, 2023, on behalf of Guangzhou Xunjie Digital Technology Co., Ltd. et al. Mail Date: Jul. 29, 2025. 9 pages.
Search Report issued for CN Application No. 2022106520930 Filed on Jun. 10, 2022 on behalf of Guangzhou Xunjie Digital Technology Co., Ltd., et al. Mail Date: Feb. 27, 2023. Chinese with English Translation. 5 pages.

* cited by examiner

INKJET INK, USES THEREOF AND RELATED COMPOSITIONS, FABRICS, METHOD AND SYSTEMS

CROSS-REFERENCE TO RELATED APPLICATIONS

The present application claims priority to Chinese Patent Application No. 202111386094.7 filed on Nov. 22, 2021, the contents of which are incorporated herein by reference in their entirety.

TECHNICAL FIELD

The present disclosure relates to the technical field of materials, and in particular, to an inkjet ink, a method for preparing the same and use thereof as well as related compositions fabrics methods and systems.

BACKGROUND

The printing technology of certain fabrics with a reactive inkjet ink has been developed for many years, based on use of a high-viscosity impermeable primer, inkjet ink by a printer, as well as water used for removing the unfixed reactive dyes and primer.

Despite attempts to improve the existing process challenges remain in optimizing timing of the process, fixation rate of the dyes and water consumption as well ensuring quality of the work product.

SUMMARY

Provided herein are an inkjet ink and related methods for the related preparation and use in printing and dyeing fabrics, which allow in several embodiments to provide printed fabric with a reduced time and material consumption and/or control the quality and/or good storage ability of the printed fabric.

According to a first aspect an inkjet ink is described, comprising following components in mass percentage: 5%-15% of a reactive dye, 15%-40% of a polyol, 2%-15% of an auxiliary agent, and water, wherein the reactive dye is selected from at least one of a dye with bifunctional reactive groups and a dye with trifunctional reactive groups.

According to a second aspect a method for preparing the inkjet ink of the present disclosure is described. The method comprises mixing various raw materials of the inkjet ink, so as to prepare the inkjet ink.

According to a third aspect a method is described for printing and/or dying a fabric the method comprising contacting a fabric with one or more inkjet dyes of the present disclosure.

The inkjet ink and related methods and systems herein described allow in some embodiments to obtain a reactive ink which can react with a fabric The inkjet ink and related methods and systems herein described allow in some embodiments to obtain an ink which can firmly adhere to the fabric, with the color fixation rate as high as 90-95%, thereby provides color fastness and less unfixed dye (only 5-10% unfixed color dye), and/or facilitates storage stability of the printed product.

The inkjet ink and related methods and systems herein described allow in some embodiments to provide an ink that can be washed with cold water or warm water to remove a primer during post-processing.

The inkjet ink and related methods and systems herein described allow in some embodiments to provide a fabric printing process improved with respect to existing processes at least in that the washing period is short, and the printed fabric can meet the requirements of clothing use even without washing by water.

The inkjet ink and related methods and systems herein described allow in some embodiments to perform digital printing with only 1 or 2 steps of washing with warm water to remove the primer with little resulting floating coaler, due to high color fixation rate. Accordingly the washing efficacy of the related printing is significantly improved with respect to conventional inks which require 6-step washing (washing with cold water-washing with warm water-neutralization-soaping at high temperature-soaping at high temperature-washing with warm water) after printing, so as to remove a primer and a large amount of floating color.

The inkjet ink and related methods and systems herein described can be used in connection with applications wherein coloration of textile material is desired without limiting to a particular industry. an ordinary skilled person in the art.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the detailed description and the examples, serve to explain the principles and implementations of the disclosure.

DETAILED DESCRIPTION

Figure 1:
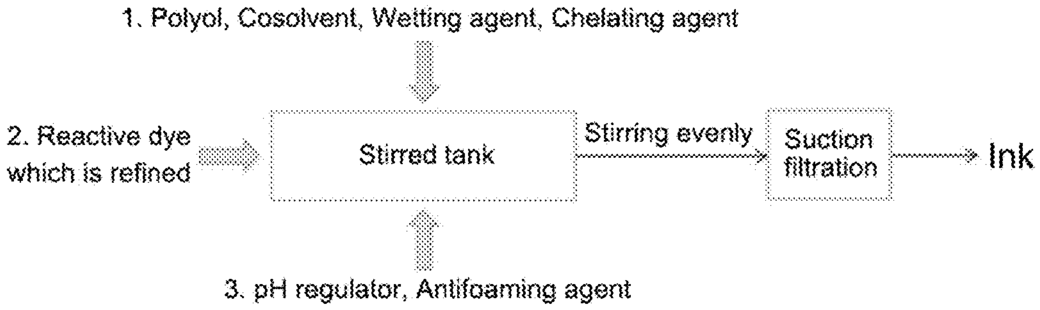
FIG. 1 is a flow chart of a process of preparing the inkjet ink in Example 1.

Described herein are an inkjet ink and related methods for the related preparation and use in printing and dyeing fabrics, and related compositions, printed fabric, methods and systems.

The term "ink" as used herein indicates a gel, sol, or solution that contains at least one colorant, such as a dye or pigment, and is used to color a surface to produce an image, text, or design. Ink formulas vary, but commonly involve two components including Colorants and Vehicles. Suitable colorants comprise pigments and dye. The vehicles usually comprise binders. Inks in the sense of the disclosure can be in an aqueous liquid paste and/or powder form depending on the colorant and vehicle used as will be understood by a person with ordinary skills in the art. (Wikipedia-ink 2022)

The term “inkjet ink” as used herein indicates an ink in a formulation enabling application through nozzles on a substrate of interest. Inkjet inks comprises liquid ink that can be applied in the form of resultant ink droplets to form a pattern on the substrate. Inkjet ink may also comprise solid ink formulations, which usually are waxy ink with a consistency similar to a crayon, as will be understood by a person having ordinary skills in the art. Inkjet ink can be in either dye-based or pigmented forms as will be understood by a person having ordinary skills in the art.

The term “pigment” as used herein indicates a colored material that is completely or nearly insoluble in water. In contrast, dyes are typically soluble, at least at some stage in their use. Generally dyes are often organic compounds whereas pigments are often inorganic compounds. Exemplary pigments comprise ochre, charcoal, and lapis lazuli as will be understood by a person with ordinary skill in the art. (Wikipedia-pigment 2022)

The term “dye” as used herein indicates a colored substance that chemically bonds to the substrate to which it is being applied. This property distinguishes dyes from pigments which do not chemically bind to the material they color. A dye in the sense of the disclosure is generally applied in an aqueous solution, and may require a mordant to improve the fastness of the dye on the fiber. Dyes are usually soluble in water whereas pigments are insoluble. Some dyes can be rendered insoluble with the addition of salt to produce a fake pigment as will be understood by a person with ordinary skills (Wikipedia-dye 2022)

Dyes in the sense of the disclosure can be classified, according to their solubility and chemical properties, as acid dyes, basic dyes, mordant dyes, vat dyes, and reactive dye. (Wikipedia-dye 2022)

In particular, in a reactive dye, a chromophore (an atom or group whose presence is responsible for the color of a compound) contains a substituent that reacts with the substrate. In reactive dyes, the covalent bonds that attach reactive dye to natural fibers make them among the most permanent of dyes. Reactive dyes have good fastness properties owing to the covalent bonding that occurs during dyeing and can be used for coloring various types of fabric such as cellulose fibers. wool and nylon; in the latter case they are applied under weakly acidic conditions. (Wikipedia-reactive-dye 2022)

Reactive dyes can react with a substrate at various temperatures as will be understood by a person with ordinary skills in the art. “Cold” reactive dyes, which can be applied at room temperature comprise Procion MX, Cibacron F, and Drimarene K. as will be understood by a skilled person (Wikipedia-reactive-dye 2022).

Exemplary reactive dyes are reported in Table 1 below with corresponding fixation process and temperature as will be understood by an ordinary skilled person in the art

TABLE 1

Exemplary Reactive Dyes

| Functionality | Fixation | Temperature |
|---|---|---|
| Monochlorotriazine | Haloheterocycle | 80° C. |
| Monofluorochlorotriazine | Haloheterocycle | 40° C. |
| Dichlorotriazine | Haloheterocycle | 30° C. |

TABLE 1-continued

Exemplary Reactive Dyes

| Functionality | Fixation | Temperature |
|---|---|---|
| Difluorochloropyrimidine | Haloheterocycle | 40° C. |
| Dichloroquinoxaline | Haloheterocycle | 40° C. |
| Trichloropyrimidine | Haloheterocycle | 80-98° C. |
| Vinyl sulfone | activated double bond | 40° C. |
| Vinyl amide | activated double bond | 40° C. |

(Wikipedia-reactive-dye 2022).

In an embodiment of the present disclosure, an inkjet ink comprises the following components in mass percentage: 5%-15% of a reactive dye, 15%-40% of a polyol, 2%-15% of an auxiliary agent, and water, wherein the reactive dye is selected from at least one of a dye of Formula (I) with bifunctional reactive groups and a dye with trifunctional reactive groups.

$$D\text{-}L_n\text{-}G_m \quad (I)$$

wherein D refers to a dye moiety, G refers to a reactive group, m refers to the number of reactive groups and ranges from 2 to 5, L refers to a linker covalently connected to the dye moiety and the reactive groups, n ranges from 0 to 1, wherein number of unique reactive groups G ranges from 1 to m. As described herein, when n is 0, the dye moiety is directly connected with the reactive groups $G_m$.

The term “reactive group” as used herein indicates specific groups of atoms within a molecular structure that are responsible for the characteristic chemical reactions of that structure and are configured to undergo chemical reactions. More particularly, as used herein, a reactive group refers to an organic moiety that contains a functional group which is capable of undergoing chemical reaction with a solid substrate to form a covalent bond with the solid substrate under suitable conditions. A reactive as described herein is thus structurally complementary to a chemical moiety on the substrate to form a covalent bond with the chemical moiety.

In an inkjet ink of Formula (I) comprises at least two reactive groups of the same or different and a dye moiety. After a reactive dye reacts with the substrate, such as a textile, the dye moiety is attached to the textile via the reactive group by a covalent bond as will be understood by a person with ordinary skills in the art upon reading of the present disclosure. As described herein, any of the reactive groups G1 to G5 are capable of undergoing a chemical reactive with a corresponding chemical moiety on the substrate to form a covalent bond.

A person with ordinary skills in the art will be able to identify a possible reactive groups applicable in view of the substrate and in particular fabric of choice.

In some embodiments, Gm is represented by Formula (II)

(II)

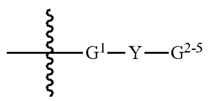

wherein $G^{1-5}$ refers to each of the reactive groups $G^1$, $G^2$, $G^3$, $G^4$, and $G^5$ that are connected via a spacer Y.

The term “spacer” as used herein indicates a chemical moiety that confers a structural feature but that is chemically inert under the reaction conditions involving the reactive group.

In some embodiments, the spacer Y can be selected from the group comprising substituted or unsubstituted, linear or branched, alkyl, alkenyl, alkynyl, aryl, arylalkyl or alkylaryl groups having equal to or less than 24 carbon atoms, wherein 0 to 6 of the carbon atoms in the alkyl, alkenyl, alkynyl, aryl, arylalkyl or alkylaryl groups can optionally be replaced by a heteroatom including O, N, S, or P. For example, when a carbon atom in benzene aryl group is replaced with N, it become a pyridine heteroaromtic group. In further example, when carbon atom (CH2) of alkyl group is replaced with O, it becomes an ether group.

Preferably, m of Formula (I) is 2 and the dye with bifunctional reactive groups $G^1$ and $G^2$ is selected from at least one of divinyl sulfone type reactive dye, reactive dye of monochloro-s-triazine compounded with vinyl sulfone, reactive dye of monofluoro-s-triazine compounded with vinyl sulfone, reactive dye of monochloro-s-triazine compounded with fluoro-chloro-pyrimidine, and reactive dye of monofluoro-s-triazine compounded with fluoro-chloro-pyrimidine. More preferably, the dye with bifunctional reactive groups is the divinyl sulfone type reactive dye.

In some embodiments, a reactive group G of Formula (I) and/or at least one of the reactive groups G1, G2, G3, G4 and G5 of Formula (II) comprises at least two of the reactive groups each selected independently from Formula (IIIA), Formula (IIIB), Formula (IIIC), Formula (IIID), Formula (IIIE), Formula (IIIF), Formula (IIIG), or Formula (IIIH), wherein R for Formula (IIIB) and Formula (IIIC) is independently selected from the group comprising H, linear or branched, substituted or unsubstituted C1-C18 alkyl, C1-C18 alkenyl, C1-C18 alkynyl, C1-C18 alkoxy, C1-C18 alkylamino, C1-C18 alkylmercapto groups, C6-C18 aryl, C6-C18 aryloxy, C6-C18 arylamino, C6-C18 arylmercapto groups, preferably C1-C8 alkyl, C1-C8 alkenyl, C1-C8 alkynyl, C1-C8 alkoxy, C1-C8 alkylamino, C1-C8 alkylmercapto groups, C6-C8 aryl, C6-C8 aryloxy, C6-C8 arylamino, C6-C8 arylmercapto groups.

(IIIA)

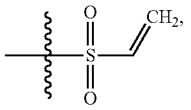

(IIIB)

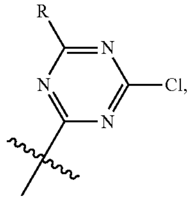

(IIIC)

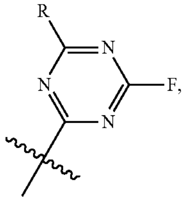

-continued (IIID)

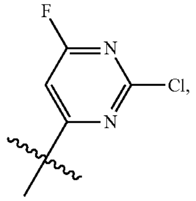

(IIIE)

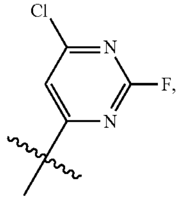

(IIIF)

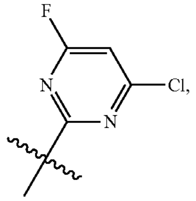

(IIIG)

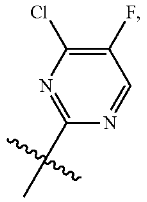

(IIIH)

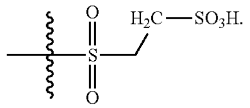

In some embodiments, the reactive dye of Formula (I) is the dye with trifunctional reactive groups.

In some embodiments, m of Formula (I) is 3 and the reactive dye as described herein comprises three of the reactive groups $G^1$, $G^2$ and $G^3$ of the same selected from Formula (MA), Formula (IIIB), Formula (IIIC), Formula (IIID), Formula (IIIE), Formula (IIIF), Formula (IIIG), or Formula (IIIH).

In some embodiments, the reactive dye of Formula (I) comprises three reactive groups each selected independently from Formula (IIIA), Formula (IIIB), Formula (IIIC), Formula (IIID), Formula (IIIE), Formula (IIIF), Formula (IIIG), or Formula (IIIH).

In some embodiments, the reactive dye of Formula (I) comprises three of the reactive groups of the same selected from Formula (IIIA), Formula (MB), Formula (IIIC), Formula (IIID), Formula (IIIE), Formula (IIIF), Formula (IIIG), or Formula (IIIH).

In some embodiments, the reactive dye of Formula (I), the dye with trifunctional reactive groups is a dye comprising trifunctional reactive groups $G^1$, $G^2$ and $G^3$, wherein the active group is selected from at least one of monochloro-s-triazine group, monofluoro-s-triazine group, vinyl sulfone group, and fluoro-chloro-pyrimidine group.

In some embodiments, the reactive dye of Formula (I) with bifunctional reactive groups (m=2) or the dye with trifunctional reactive groups (m=3) is selected from at least one of a yellow reactive dye, an orange reactive dye, a magenta reactive dye, a brilliant blue reactive dye, a navy-blue reactive dye, and a black reactive dye. Reactive dyes in a variety of colors can meet the current requirements of reactive printing for color gamut. More preferably, the black reactive dye is a reactive black KN—B.

In some embodiments, the dye moiety D of Formula (I) is selected from the group comprising (IVB)

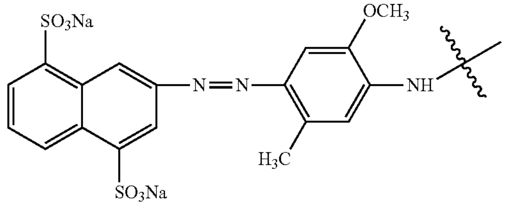

, (IVB)

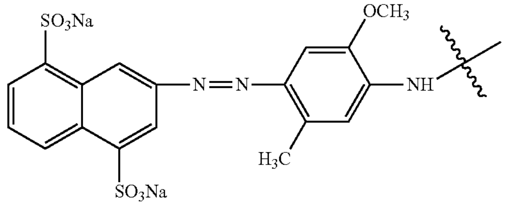

, (IVC)

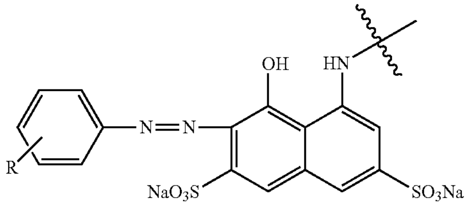

wherein R for Formula (IVC) is selected from the group comprising H, Cl, CH3, OCH3, OH, SH, CO2H, and SO3H and can be in any of position of the attached benzene ring including positions ortho, meta or para position.

In an inkjet ink of the disclosure the reactive dye of Formula (I), is comprised at a mass percentage of 5%-15%. In some preferred embodiments of the inkjet ink of the disclosure, the mass percentage of the reactive dye is 8%-12%; more preferably, the mass percentage of the reactive dye is 9%-11%. As used herein, a range in a mass percentage is inclusive of the lowest percentage and highest percentage of the range. For example, a mass percentage of 5%-15% is inclusive of 5% and 15%.

In an inkjet ink of the disclosure the reactive dye of Formula (I), is comprised with 15%-40% of a polyol, 2%-15% of an auxiliary agent, and water, as will be understood by an ordinary skilled person in the art upon reading of the present disclosure.

The term "polyol" as used herein indicates organic compound containing at least two hydroxyl groups (—OH). Polyols containing two, three and four hydroxyl groups are diols, triols, and tetrols respectively. Polyols are usually highly viscous (when polymeric) to solid (when low-molecular weight) at room temperature due to hydrogen bonding. Exemplary polyols comprise polyether, polyester, polycarbonate and acrylic polyols. Polyether polyols can be further subdivided and classified as polyethylene oxide or polyethylene glycol (PEG), polypropylene glycol (PPG) and Polytetrahydrofuran or PTMEG. (Wikipedia-polyol 2022)

Polyols that can be used in the inkjet ink of the disclosure comprise a polyol of Formula (V)

$$Q(OH)_m \quad (V)$$

wherein m ranges from 2 to 10, Q is a chemical substituted or unsubstituted, linear or branched aliphatic group having a mass of 24 to 2000, wherein one carbon, up to one in every three carbon atoms (or CH2) in the aliphatic group is replaced by oxygen atom to form an ether group (CH2-O—CH2).

In some embodiments of the inkjet ink of the disclosure, the polyol is selected from at least one of ethylene glycol, glycerol, diethylene glycol, 1,2-hexanediol, 1,6-hexanediol, 1,5-pentanediol, 1,4-dibutanol, 1,2-propanediol, diethylene glycol butyl ether, polyethylene glycol 200 (PEG-200), polyethylene glycol 400 (PEG-400), and polyethylene glycol 600 (PEG-600); more preferably, the polyol is selected from at least one of ethylene glycol, glycerol, 1,2-hexanediol, and 1,5-pentanediol.

In some embodiments of the inkjet ink of the disclosure, the mass percentage of the polyol is 20%-30%; more preferably, the mass percentage of the polyol is 22%-28%.

As used herein, the term "auxiliary agent" refers a compound that confers a chemical, physical or biological property to a composition further including a reagent (substance or compound added to a system to cause a chemical reaction). Accordingly, auxiliary agents in the sense of the disclosure comprise substances like solvents, separation agents, or dispersing agents that are used in the course of a chemical reaction typically to support the action of the reactants and thus ease a desired outcome.

In some embodiments of the inkjet ink of the disclosure, the mass percentage of the auxiliary agent is 2.5%-15%; preferably, the mass percentage of the auxiliary agent is 4%-10%.

In some embodiments of the inkjet ink of the disclosure, the auxiliary agent is selected from at least one of a cosolvent, a wetting agent, a chelating agent, a pH regulator, an antifoaming agent, a leveling agent, and an antibacterial agent.

As used herein, the term "cosolvent" refers to a substance added to a primary solvent in small amounts to increase the solubility of a compound in the solvent. The term "solvent" as used herein indicates a substance that dissolves a solute, resulting in a solution. A solvent is usually a liquid but can also be a solid, a gas, or a supercritical fluid. An exemplary solvent is water which is typically used for solute formed by polar molecules. Exemplary co-solvents are alcohols which are frequently used as cosolvents in water (often less than 5% by volume) to dissolve hydrophobic molecules during extraction, screening, and formulation. (Wikipedia-solvent 2022)

In embodiments, a cosolvents can be an organic solvent that are mixed with another solvent including water. In some embodiments, a cosolvent can make components in a mixture that otherwise are immiscible become mixable.

In some embodiments, the cosolvent can comprise a organic solvent that has a molecular weight less than 200 and a boiling point higher than 50° C. and a solubility in water of at least 10 w % at 20° C.

In some preferred embodiments of the inkjet ink of the disclosure, the cosolvent is selected from at least one of 2-methylpyrrolidone, N-methylpyrrolidone, dimethyl sulfoxide, N,N-dimethylacetamide, and N,N-dimethylformamide. More preferably, the cosolvent is N-methylpyrrolidone.

In some preferred embodiments of the inkjet ink of the disclosure, the mass percentage of the cosolvent is 0.1%-5%; more preferably, the mass percentage of the cosolvent is 0.5%-1%.

As used herein, the term "chelating agent" indicates a chemical compound whose structures permit the attachment of two or more donor atoms to a metal ion. Chelation typically involves the formation or presence of two or more separate coordinate bonds between a polydentate (multiple bonded) chelating agent and a single central metal atom. Chelating agent, also called chelants, chelators, or sequestering agents are usually organic compounds as will be understood by an ordinary skilled person in the art. (Wikipedia-chelation 2022)

In some preferred embodiments of the inkjet ink of the disclosure, the chelating agent is selected from at least one of ethylenediamine tetraacetic acid (EDTA), ethylenebis (nitrilodimethylene)tetraphosphonic acid (EDTMPA), etidronic acid (HEDPA), citric acid, and maleic acid.

In some preferred embodiments of the inkjet ink of the disclosure, the mass percentage of the chelating agent is 0.01%-0.2%; more preferably, the mass percentage of the chelating agent is 0.1%-0.2%.

As used herein, the term "wetting agent" refers a compound that lowers the surface tension between a liquid and a solid substrate. The degree of wetting (wettability) is determined by a force balance between adhesive (tendency of dissimilar particles or surfaces to cling to one another) forces. and cohesive (tendency of similar or identical particles/surfaces to cling to one another) forces, resulting from intermolecular interactions of the liquid and solid substrate. Wetting agents in the sense of the disclosure lower the tension between liquid and substrate thus improving adherence of the liquid to the substrate. (Wikipedia-wetting 2022)

In some embodiments of the inkjet ink of the disclosure, the wetting agent is selected from at least one of AEO-3, AEO-5, AEO-7, AEO-9, AEP-98, Surfynol 465, and Surfynol 104PG50; more preferably, the wetting agent is selected from at least one of Surfynol 465 and Surfynol 104PG50.

In some preferred embodiments of the inkjet ink of the disclosure, the mass percentage of the wetting agent is 2%-4%; more preferably, the mass percentage of the wetting agent is 2%-3%.

As used herein, the term "pH regulator" indicates a substance that can be used to change or maintain pH (acidity or basicity) of a substance. Accordingly, a pH regulator in the sense of the disclosure can be an auxiliary agent that when added to a composition will change the pH value of the composition A pH regulator in the sense of the disclosure can be organic or mineral acids, bases, neutralizing agents, or buffering agents. Typical agents include sorbic acid, acetic acid, benzoic acid, propionic acid and/or their salt. (Wikipedia-acid-regulator 2022)

A pH regulator in some embodiments of the disclosure can be an organic base including a primary, secondary or tertiary amine as well as additional pH regulators identifiable by an ordinary skilled person in the art.

In some preferred embodiments of the inkjet ink of the disclosure, the pH regulator can be selected from at least one of triethanolamine, diethanolamine, and ethanolamine; more preferably, the pH regulator is triethanolamine.

In some preferred embodiments of the inkjet ink of the disclosure, the mass percentage of the pH regulator is 0.1%-1%; more preferably, the mass percentage of the pH regulator is 0.1%-0.5%.

As used herein, the term "antifoaming agent" refers to a chemical additive that reduces and hinders the formation of foam in industrial process liquids. Accordingly, antifoaming agents can reduce or eliminate existing foam and antifoamers can also prevent the formation of further foam. In the inkjet ink of the disclosure an antifoaming agent an auxiliary agent that reduces and hinders the formation of foam a liquid including inkjet ink. Commonly used antifoaming agents are insoluble oils, polydimethylsiloxanes and other silicones, certain alcohols, stearates and glycols. (Wikipedia-defoamer 2022)

In some embodiments, the inkjet ink of the disclosure can comprise one or more antifoaming agents such as are certain alcohols (cetostearyl alcohol), insoluble oils (castor oil), stearates, polydimethylsiloxanes and other silicones derivatives, ether and glycols.

In some preferred embodiments of the inkjet ink of the disclosure, the antifoaming agent is Surfynol 104PG50.

In some embodiments of the inkjet ink of the disclosure, the mass percentage of the antifoaming agent is 0.1%-2%; more preferably, the mass percentage of the antifoaming agent is 0.1%-1%.

As used herein, the term "antibacterial agent" refers to a substance that can inhibit viability of one or more bacteria, preferably minimizing viability and/or pathogenic effect of the one or more bacteria in a target environments. Exemplary antibacterial agents disinfectants (non-selective agents, such as bleach), which kill a wide range of microbes on non-living surfaces to prevent the spread of illness, antiseptics (which are applied to living tissue and help reduce infection during surgery), and antibiotics (which destroy microorganisms within the body). (Wikipedia-antimicrobial 2022)

In some embodiments of the inkjet ink of the disclosure, the antibacterial agent is Proxel GXL.

As used herein, the term "leveling agent" refers to a compound that enhances its uniformity of coating and shade of a dyeon a solid substrate.

In some embodiments, a leveling agent that can be comprised in the inkjet ink formulation of the instant disclosure comprises an anionic, cationic or neutral compound.

In some embodiments of the inkjet ink of the disclosure, the leveling agent is a silyl ether leveling agent; more preferably, the leveling agent is ST-1075.

In some embodiments of the inkjet ink of the disclosure, based on the total mass of the inkjet ink, the mass percentage of the cosolvent is 0.1%-5%, the mass percentage of the wetting agent is 1%-5%, the mass percentage of the chelating agent is 0.005%-0.2%, the mass percentage of the pH regulator is 0.005%-1%, the mass percentage of the antifoaming agent is 0.005%-2%, the mass percentage of the antibacterial agent is 0.01%-1%, and the mass percentage of the leveling agent is 0.01%-0.1%.

In some embodiments of the inkjet ink of the disclosure, the inkjet ink is a digital inkjet ink.

The inkjet in of the disclosure can be prepared by methods identifiable by an ordinary skilled person in the art upon reading of the present disclosure, comprising mixing various raw materials of the inkjet ink, so as to prepare the inkjet ink.

In some embodiments, the method for preparing the inkjet ink comprises the following steps: mixing the polyol, the cosolvent, the wetting agent, and the chelating agent; then adding deionized water for mixing, and then adding the reactive dye for mixing and dissolving; and adding the pH regulator for adjusting a pH value of the ink, and adding the antifoaming agent for mixing, and then performing a suction filtration, so as to prepare the inkjet ink.

In some embodiments of the method for preparing the inkjet ink of the disclosure, the suction filtration is performed by using a filter membrane of 0.1-0.3 More preferably, the suction filtration is performed by using a filter membrane of 0.22 μm.

In some embodiments of the present disclosure, the inkjet ink of the disclosure can be used in fabrics printing and dyeing.

The word "fabrics" or "textile" as used herein refers various fiber-based materials, including fibers, yarns, filaments, threads, different fabric types, and additional fiber-based material identifiable by an ordinary skilled person in the art. Fabrics in the sense of the disclosure comprise consumer textiles such as clothing, where the primary purpose of the fabric is comfort and/or style. Fabrics in the sense of the disclosure also comprise technical textiles such as geotextile, industrial textile, medical textiles where functionality is the primary purpose of the fabric. Exemplary fabrics comprise woven fabrics, knitted fabrics, non-woven fabrics and additional fabrics identifiable by an ordinary skilled person in the art. Fabrics in the sense of the disclosure comprise natural fabric and synthetic fibers or mixtures thereof. (Wikipedia-textile 2022)

In some embodiments, fabrics that can be treated with the ink of the disclosure comprises cotton, rayon, wool and silk.

The term "printing" or "fabric printing" in the sense of the disclosure is the process of applying color to fabric in definite patterns or designs. Suitable methods, result in printed fabrics where the color is bonded with the fiber, so as to resist washing and friction. In suitable fabric printing method, wooden blocks, stencils, engraved plates, rollers, or silkscreens can be used to place colors on the fabric. Colorants used in printing contain dyes thickened to prevent the color from spreading by capillary attraction beyond the limits of a pattern or design. Exemplary printing methods comprise direct printing, in which colorants containing dyes, thickeners, and the mordants or substances necessary for fixing the color on the cloth are printed in the desired pattern. Exemplary printing methods further comprise printing of a mordant in the desired pattern prior to dyeing cloth; the color adheres only where the mordant was printed. Exemplary printing methods also comprise resist dyeing, in which a wax or other substance is printed onto fabric which is subsequently dyed. The waxed areas do not accept the dye, leaving uncolored patterns against a colored ground. (Wikipedia-textile-printing 2022)

Exemplary printing methods typically comprise the following steps pre-treatment of fabric, preparation of colors, preparation of printing paste, impression of paste on fabric using printing methods, drying of fabric, fixing the printing with steam after process treatments. (Wikipedia-textile-printing 2022) The term "dyeing" in the sense of the disclosure indicates the application of dyes or pigments on textile materials with the goal of achieving color with desired color fastness. Dyeing is usually performed by applying a solution containing dyes to a substrate material. Dye molecules can be fixed to the fiber by absorption, diffusion, or bonding with temperature and time being key controlling factors. The bond between dye molecule and fiber may be strong or weak, depending on the dye used. Dyeing and printing are different applications; in printing, color is applied to a localized area with desired patterns as will be understood by an ordinary skilled person in the art. (Wikipedia-dyeing 2022)

In some embodiments of the disclosures, method of printing and dying fabrics of the disclosure, comprising steps of: S1: performing pretreatment on a fabric with a primer; S2: printing and dyeing the inkjet ink provided by the first aspect of the present disclosure onto the fabric; and S3: steaming.

In some embodiments of the disclosures, method of printing and dying fabrics of the disclosure, a steaming time is 1-5 minutes; more preferably, the steaming time is 1-3 minutes. Compared with conventional K-type reactive dye, the steaming time is greatly shortened, and it can maintain high color fastness and color fixation rate, greatly decrease the time required for the use of the inkjet ink and improve the efficiency of inkjet ink usage.

As used herein, the term color fastness refers to a resistance of a colored solid substrate including a fabric to change its color characteristics on a scale of 1 to 5 wherein 1 corresponds to complete loss of color and 5 to no change in color. A color fastness can be measured by a color fastness tester.

In some embodiments of the disclosures, a temperature of the steaming is 102-105° C.

In some embodiments of the disclosures, the primer comprises the following raw materials in mass percentage: 3% sodium alginate, 0.5% sodium bicarbonate, 8-13% urea, 1% reserve salt, 0.1% antifoaming agent, and water. The primer used in several embodiments of the present disclosure has low alkalinity and little corrosion to the fabric. After printing and dyeing the inkjet ink according to the present disclosure, the fabric will not be damaged by corrosion.

In some embodiments of the present disclosure, the reactive dye in the inkjet ink provided by the present disclosure has high reactivity, as the reactive dye can react with a fabric and firmly adhere to the fabric, with the color fixation rate as high as 90-95%, In some embodiments of the present disclosure, the reactive dye in the inkjet ink provided by the present disclosure has strong color fastness, In some embodiments of the present disclosure, the reactive dye in the inkjet ink provided by the present disclosure has less unfixed dye, In some embodiments of the present disclosure, the reactive dye in the inkjet ink provided by the present disclosure has better storage stability.

The inkjet ink according to the present disclosure only needs to be washed with cold water or warm water to remove a primer during post-processing, and the washing period is short, and it can meet the requirements of clothing use even without washing by water.

The methods and use of the inkjet ink according to the present disclosure is simple and easy to operate, and is easy to achieve industrialization.

The specific implementation of the embodiments in accordance with the present disclosure will be further described in detail below with reference to the accompanying drawings and examples, but the implementation and protection of the present disclosure are not limited herein.

Accordingly further advantages and characteristics of the present disclosure will become more apparent hereinafter from the following Example Section by way of illustration only with reference to an experimental section.

EXAMPLES

The inkjet ink, materials, compositions, methods system herein described are further illustrated in the following examples, which are provided by way of illustration and are not intended to be limiting.

In particular, the following examples illustrate exemplary inkjet inks and related methods and systems. A person skilled in the art will appreciate the applicability and the necessary modifications to adapt the features described in detail in the present section, to additional inkjet inks, compositions, methods and systems according to embodiments of the present disclosure. The following materials and methods were used T Materials: Wetting agent S465 was purchased from Air Products (USA); Surfynol 104PG50 was purchased from Air Products (USA); and antibacterial agent Proxel GXL was purchased from Air Products (USA). The reagents or instruments used without showing their manufacturers are regarded as conventional products which can be purchased in the market.

Methods: It should be pointed out that all the processes that are not described in details below could be implemented or understood by those skilled in the art.

Example 1 Inkjet Ink and Related Method of Preparation

The inkjet ink in this example comprises: 23.5 g of ethylene glycol, 1.5 g of 1,2-hexanediol, 1 g of N-methylpyrrolidone, 1 g of wetting agent 5465, 0.1 g of fatty alcohol polyoxyethylene ether AEO-3, 0.1 g of ethylenediamine tetraacetic acid, 0.1 g of triethanolamine, 62.6 g of deionized water, 10 g of pure red reactive dye (comprising one monofluoro-s-triazine, one monochloro-s-triazine and one vinyl sulfone sulphate active group), and 0.1 g of antibacterial agent Proxel GXL.

The inkjet ink in this example is prepared by the following method: 23.5 g of ethylene glycol, 1.5 g of 1,2-hexanediol, 1 g of N-methylpyrrolidone, 1 g of wetting agent S465, 0.1 g of fatty alcohol polyoxyethylene ether AEO-3, 0.1 g of ethylenediamine tetraacetic acid, 0.1 g of triethanolamine, 62.6 g of deionized water and 10 g of pure red reactive dye are weighed and taken, stirring to dissolve, and then 0.1 g of antibacterial agent Proxel GXL is added, the stirring continues for dissolving. Afterwards, an aqueous filter membrane of 0.2 μm is utilized for suction filtration twice, so as to prepare the red inkjet ink in this example. A flow chart of a process of preparing the inkjet ink in this example is shown in FIG. 1.

Example 2 Inkjet Ink and Related Method of Preparation

The inkjet ink in this example comprises: 23 g of ethylene glycol, 2 g of 1,2-hexanediol, 0.5 g of N-methylpyrrolidone, 2 g of wetting agent S465, 0.1 g of fatty alcohol polyoxyethylene ether AEO-3, 0.1 g of ethylenediamine tetraacetic acid, 0.1 g of triethanolamine, 62.1 g of deionized water, 10 g of pure yellow reactive dye (comprising one monofluoro-s-triazine, one fluoro-chloro-pyrimidine and one vinyl sulfone sulphate active group), and 0.1 g of antibacterial agent Proxel GXL.

The inkjet ink in this example is prepared by the following method: 23 g of ethylene glycol, 2 g of 1,2-hexanediol, 0.5 g of N-methylpyrrolidone, 2 g of wetting agent 5465, 0.1 g of fatty alcohol polyoxyethylene ether AEO-3, 0.1 g of ethylenediamine tetraacetic acid, 0.1 g of triethanolamine, 62.1 g of deionized water and 10 g of pure yellow reactive dye are weighed and taken, stirring to dissolve, and then 0.1 g of antibacterial agent Proxel GXL is added, the stirring continues for dissolving. Afterwards, an aqueous filter membrane of 0.2 μm is utilized for suction filtration twice, so as to prepare the yellow inkjet ink in this example.

Example 3: Inkjet Ink and Related Method of Preparation

The inkjet ink in this example comprises: 23 g of ethylene glycol, 2 g of 1,2-hexanediol, 0.5 g of N-methylpyrrolidone, 3 g of wetting agent S465, 0.2 g of fatty alcohol polyoxyethylene ether AEO-3, 0.1 g of ethylenediamine tetraacetic acid, 0.1 g of triethanolamine, 61 g of deionized water, 10 g of pure orange reactive dye (comprising two monofluoro-s-triazine and one vinyl sulfone sulphate active group), and 0.1 g of antibacterial agent Proxel GXL.

The inkjet ink in this example is prepared by the following method: 23 g of ethylene glycol, 2 g of 1,2-hexanediol, 0.5 g of N-methylpyrrolidone, 3 g of wetting agent S465, 0.2 g of fatty alcohol polyoxyethylene ether AEO-3, 0.1 g of ethylenediamine tetraacetic acid, 0.1 g of triethanolamine, 61 g of deionized water and 10 g of pure orange reactive dye are weighed and taken, stirring to dissolve, and then 0.1 g of antibacterial agent Proxel GXL is added, the stirring continues for dissolving. Afterwards, an aqueous filter membrane of 0.2 μm is utilized for suction filtration twice, so as to prepare the orange inkjet ink in this example.

Example 4 Inkjet Ink and Related Method of Preparation

The inkjet ink in this example comprises: 25 g of ethylene glycol, 2 g of 1,2-hexanediol, 0.5 g of N-methylpyrrolidone, 2 g of wetting agent S465, 0.2 g of Surfynol 104PG50, 0.1 g of leveling agent ST-1075, 0.1 g of ethylenediamine tetraacetic acid, 0.1 g of triethanolamine, 59.9 g of deionized water, 10 g of pure navy blue reactive dye (comprising one monofluoro-s-triazine and two vinyl sulfone sulphate active groups), and 0.1 g of antibacterial agent Proxel GXL.

The inkjet ink in this example is prepared by the following method: 25 g of ethylene glycol, 2 g of 1,2-hexanediol, 0.5 g of N-methylpyrrolidone, 2 g of wetting agent S465, 0.2 g of Surfynol 104PG50, 0.1 g of leveling agent ST-1075, 0.1 g of ethylenediamine tetraacetic acid, 0.1 g of triethanolamine, 59.9 g of deionized water, 10 g of pure navy blue reactive dye and 0.1 g of antibacterial agent Proxel GXL are weighed and taken, stirring to dissolve. An aqueous filter membrane of 0.2 μm is utilized for suction filtration twice, so as to prepare the navy blue inkjet ink in this example.

Example 5 Inkjet Ink and Related Method of Preparation

The inkjet ink in this example comprises: 26 g of ethylene glycol, 2 g of 1,2-hexanediol, 0.5 g of N-methylpyrrolidone, 3 g of wetting agent S465, 0.3 g of Surfynol 104PG50, 57.8 g of deionized water, 0.1 g of leveling agent ST-1075, 0.1 g of ethylenediamine tetraacetic acid, 0.1 g of triethanolamine, 10 g of pure royal blue reactive dye (comprising one monochloro-s-triazine and two vinyl sulfone sulphate active groups), and 0.1 g of antibacterial agent Proxel GXL.

The inkjet ink in this example is prepared by the following method: 26 g of ethylene glycol, 2 g of 1,2-hexanediol, 0.5 g of N-methylpyrrolidone, 3 g of wetting agent S465, 0.3 g of Surfynol 104PG50, 57.8 g of deionized water, 0.1 g of leveling agent ST-1075, 0.1 g of ethylenediamine tetraacetic acid, 0.1 g of triethanolamine, 10 g of pure royal blue reactive dye and 0.1 g of antibacterial agent Proxel GXL are weighed and taken, stirring to dissolve. An aqueous filter membrane of 0.2 μm is utilized for suction filtration twice, so as to prepare the royal blue inkjet ink in this example.

Example 6 Inkjet Ink and Related Method of Preparation

The inkjet ink in this example comprises: 23 g of ethylene glycol, 2 g of 1,2-hexanediol, 0.5 g of N-methylpyrrolidone, 3 g of wetting agent S465, 0.3 g of Surfynol 104PG50, 55.8 g of deionized water, 0.1 g of leveling agent ST-1075, 0.1 g of ethylenediamine tetraacetic acid, 0.1 g of triethanolamine, 15 g of pure black reactive dye (comprising two vinyl sulfone sulphate active groups), and 0.1 g of antibacterial agent Proxel GXL.

The inkjet ink in this example is prepared by the following method: 23 g of ethylene glycol, 2 g of 1,2-hexanediol, 0.5 g of N-methylpyrrolidone, 3 g of wetting agent S465, 0.3 g of Surfynol 104PG50, 55.8 g of deionized water, 0.1 g of leveling agent ST-1075, 0.1 g of ethylenediamine tetraacetic acid, 0.1 g of triethanolamine, 15 g of pure black reactive dye and 0.1 g of antibacterial agent Proxel GXL are weighed and taken, stirring to dissolve. An aqueous filter membrane of 0.2 μm is utilized for suction filtration twice, so as to prepare the black inkjet ink in this example.

Example 7 Fabric Printing and Dying Process

The use of the inkjet ink in this example in fabrics printing and dyeing comprises steps of: S1: Preparing a primer: in accordance with the proportion of 3% sodium alginate, 0.5% sodium bicarbonate, 10% urea, 1% reserve salt, 0.1% anti-foaming agent (polyether modified siloxane), preparing the primer, and performing pretreatment on a fabric with the primer; S2: printing and dyeing the inkjet inks of Examples 1-6 onto the fabric by using a digital printer; and S3: steaming at 105° C. for 3 mins.

Figure 2:
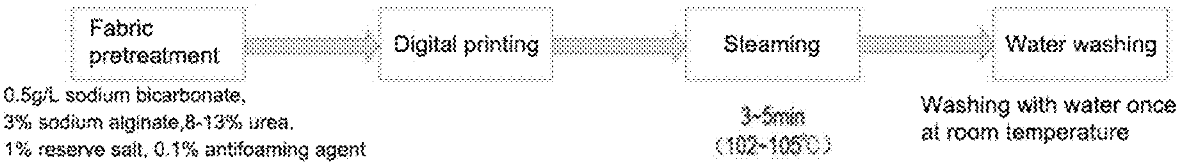
FIG. 2 is a flow chart of a process of using the inkjet ink in Example 7.

A flow chart of using the inkjet ink in this example is shown in FIG. 2.

Figure 3:
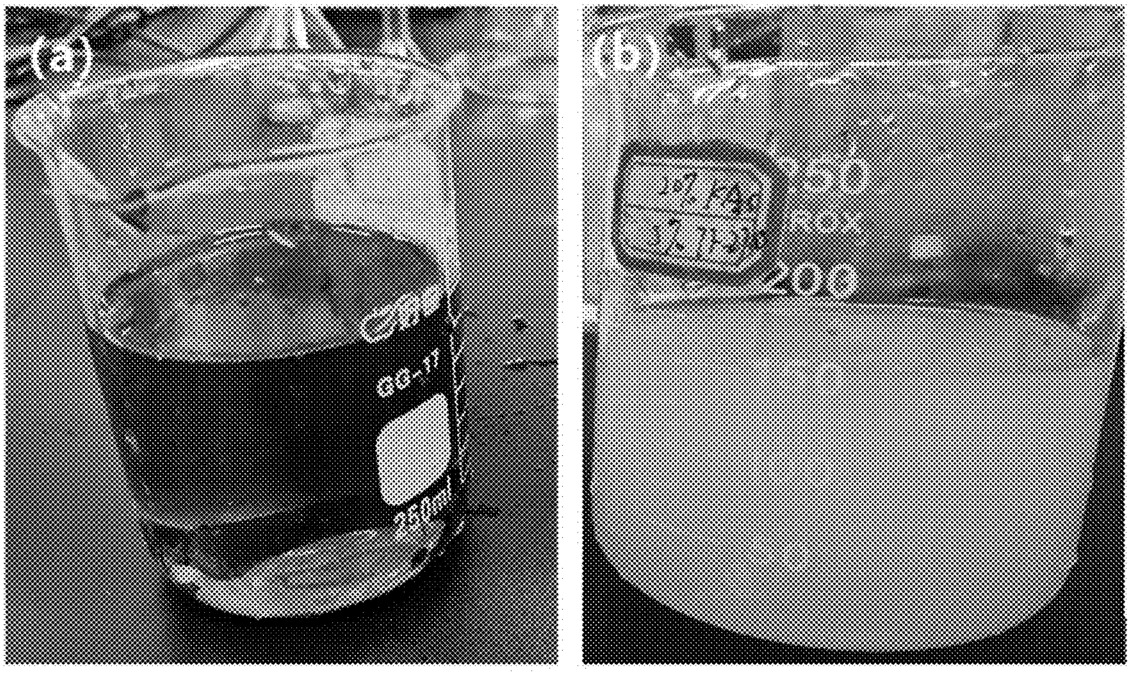
FIG. 3 is a diagram of comparison on water washing and soaping of a fabric after printing and dyeing the inkjet ink in Example 7.
Figure 4:
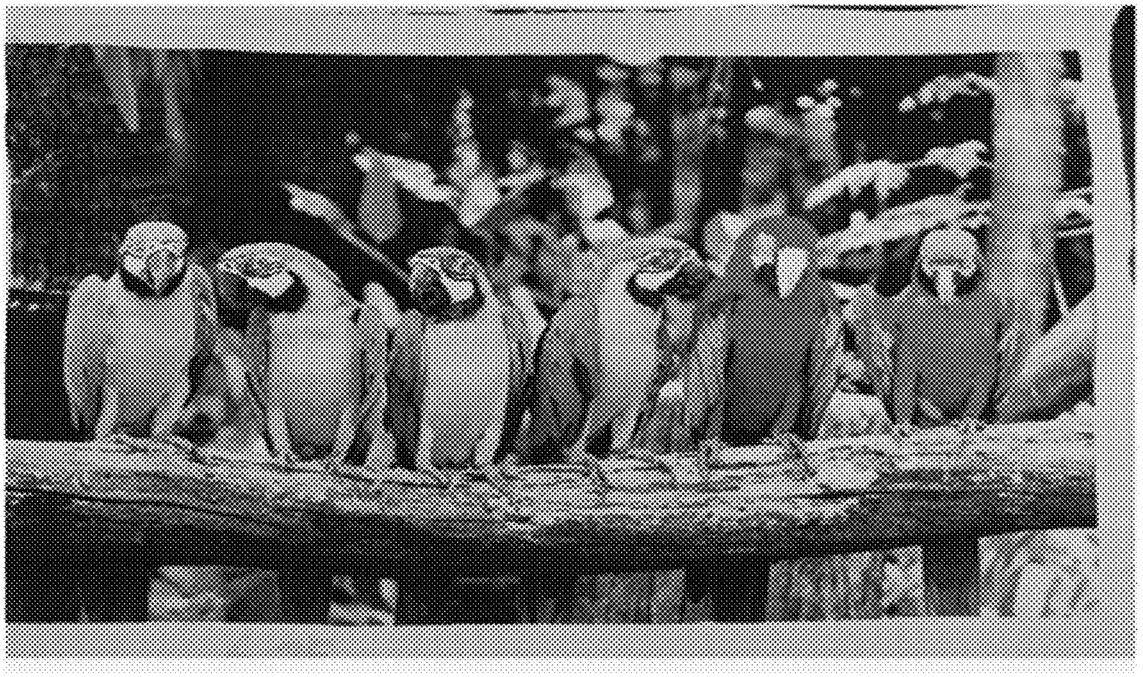
FIG. 4 is a diagram of a fabric printed and dyed by the inkjet ink in Example 7.
Figure 5:
FIG. 5 is a diagram of a fabric printed and dyed by the inkjet ink in Example 7.
Figure 6:
FIG. 6 is a diagram of a fabric printed and dyed by the inkjet ink in Example 7.
Figure 7:
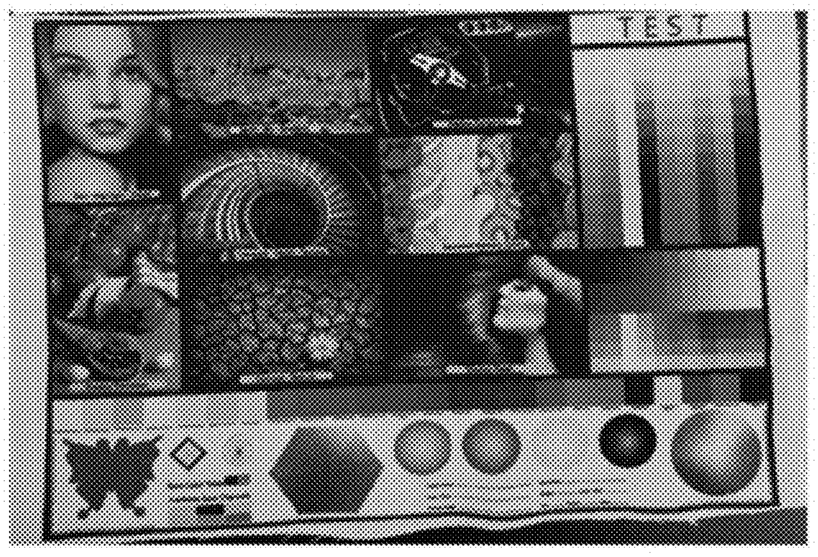
FIG. 7 is a diagram of a fabric printed and dyed by the inkjet ink in Example 7.
Figure 8:
FIG. 8 is a diagram of a fabric printed and dyed by the inkjet ink in Example 7.
Figure 9:
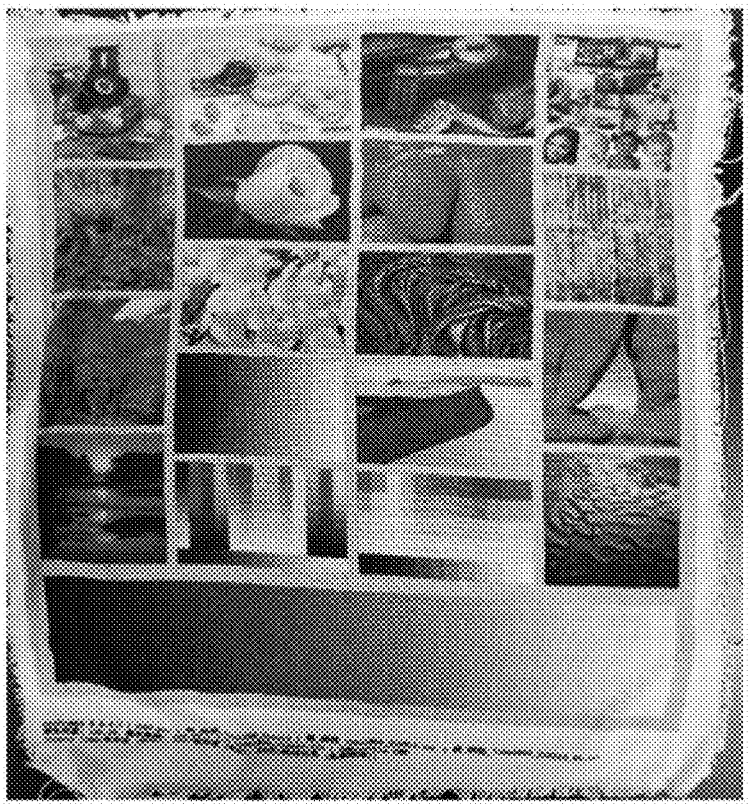
FIG. 9 is a diagram of a fabric printed and dyed by the inkjet ink in Example 7.

The printed fabric in this example is washed with water once, and a washing solution after water washing is shown in FIG. 3(*a*), and then it is washed with a soap solution. A washing solution after soaping is shown in FIG. 3(*b*). As can be seen from FIG. 3(*a*) and FIG. 3(*b*), after the inkjet ink according to the present disclosure is printed and dyed on the fabric, the washing color is relatively light, and the unfixed dye is less, and almost all unfixed dye can be removed and cleaned by one water washing. When the fabric washed with water is subject to soaping with the soap solution, there is almost no color after soaping.

Diagrams of fabrics printed and dyed by the printing and dyeing method according to Example 7 are shown in FIG. 4 through FIG. 9. As can be seen, the fabrics printed and dyed by the inkjet ink according to the present disclosure have bright colors, clear hues, and no blooming, which meet the requirements of fabrics printing and dyeing.

Example 8 Performance Test—Physical Performance Test

The physical performance of the inkjet inks prepared in Examples 1-6 was tested, and the test results were recorded in Table 2. Instruments used for the test include: QBZY series automatic surface tensiometer for surface tension measurements; Brookfield DVNext cone-and-plate rheometer for viscosity measurements. pH values were measured using a pH meter.

TABLE 2

Test of the physical performance of the inkjet ink

| Number | Color | Surface tension | Viscosity | pH |
|---|---|---|---|---|
| Example 1 | Magenta | 28.9 mN/m | 2.6 mPa · S | 7.82 |
| Example 2 | Yellow | 28.0 mN/m | 2.0 mPa · S | 7.86 |
| Example 3 | Orange | 28.1 mN/m | 2.3 mPa · S | 7.24 |
| Example 4 | Navy blue | 29.1 mN/m | 2.5 mPa · S | 6.26 |
| Example 5 | Royal blue | 30.1 mN/m | 2.2 mPa · S | 7.28 |
| Example 6 | Black | 29.9 mN/m | 3.2 mPa · S | 6.83 |

It can be seen from Table 2 that the physical performance of the inkjet inks prepared in Examples 1-6 according to the present disclosure meets the requirements of industrial inks, and can be popularized and applied in large quantities.

Example 9 Performance Test—Color Fixation Rate Test

Furthermore, the color fixation rate of the inkjet inks prepared in Examples 1-6 was tested, and the test method includes: printing conditions were set to print color blocks of a specific ink. Firstly, the color blocks were printed on a plastic wrap, all of them were washed with water, and the volume was set to a certain final volume, and its absorbance was tested to be $A_1$; subsequently, color blocks in the same size were printed on the pre-treated rayon base cloth, and they were subjected to steaming and washing with water, and then a water washing residue solution was diluted to be a constant volume which is the same as the final volume as the plastic wrap experiment, and its absorbance was tested to be $A_2$. A test method of the color fixation rate is $F\%=(A_1-A_2)/A_1$. The color fixation rates of the inkjet inks in Examples 1-6 were shown in the data of Color Fixation Rate[1] in Table 3. According to the same test method, the color fixation rate of commercially available conventional K type reactive inkjet inks (they have the same color families as the inkjet inks in Examples 1-6) on rayon was tested, specifically, as shown in the test results of Color Fixation Rate[2] in Table 3.

TABLE 3

Test of the color fixation performance of the inkjet ink

| Number | Color | Color Fixation Rate[1] | Color Fixation Rate[2] |
|---|---|---|---|
| Example 1 | Magenta | 93% | 74.5% |
| Example 2 | Yellow | 90% | 70% |
| Example 3 | Orange | 90% | 70.5% |
| Example 4 | Navy blue | 91% | — |
| Example 5 | Royal blue | 95% | 70.3% |
| Example 6 | Black | 93% | 73% |

In this case, the Color Fixation Rate' is the color fixation rate of the inkjet inks in Examples 1-6 on the rayon cloth, and the conditions for steaming include: 102° C.*3 mins, the rayon cloth is pre-treated with the primer, and the composition of the primer comprises: 0.5% sodium bicarbonate, 2% sodium alginate, 8% urea, and 1% reserve salt; the Color Fixation Rate[2] is the color fixation rate of the conventional K type reactive inkjet ink on the rayon, wherein the conventional K type reactive inkjet ink is a monochloro-s-triazine reactive inkjet ink, and the conditions for steaming include: 102° C.*10 mins, the rayon cloth is pre-treated with the primer, and the composition of the primer comprises: 3% sodium bicarbonate, 2% sodium alginate, 8% urea, and 1% reserve salt.

It can be seen from Table 3 that the color fixation rates of the inks prepared in Examples 1-6 are all over 90%, and even up to 95%, while the color fixation rate of the used conventional K type reactive inkjet ink is about 70%. Therefore, compared with the conventional K type reactive inkjet ink, the inkjet inks in Examples 1-6 of the present disclosure have high color fixation rate and very little unfixed dye after color-fixing. Hence, in the subsequent water washing, a very small amount of water is needed to remove and clean the unfixed dye, thereby avoiding the phenomenon of fabric color fading and unfixed dye and so on.

Example 10 Performance Test—Color Fastness Test

The color fastness of the fabrics dyed by the inkjet inks in Examples 1-6 was tested using a color fastness tester, and the specific test results are shown in Table 4.

TABLE 4

Test of the color fastness performance

| Number | Color | Not washed with water: Dry and wet rubbing fastness | Not washed with water: Washing fastness | Washed once with cold water: Dry and wet rubbing fastness | Washed once with cold water: Washing fastness |
|---|---|---|---|---|---|
| Example 1 | Magenta | Discoloration level 4-5, staining level 2-3 | Discoloration level 4-5, staining level 4-5 | Discoloration level 4-5, staining level 3 | Discoloration level 4-5, staining level 4-5 |
| Example 2 | Yellow | Discoloration level 4-5, staining level 3 | Discoloration level 4, staining level 4-5 | Discoloration level 4-5, staining level 3 | Discoloration level 4, staining level 4-5 |
| Example 3 | Orange | Discoloration level 4, staining level 2-3 | Discoloration level 4-5, staining level 4-5 | Discoloration level 4-5, staining level 3 | Discoloration level 4-5, staining level 4-5 |
| Example 4 | Navy blue | Discoloration level 4-5, staining level 2 | Discoloration level 4-5, staining level 4 | Discoloration level 4-5, staining level 3 | Discoloration level 4-5, staining level 4-5 |
| Example 5 | Royal blue | Discoloration level 4-5, staining level 3 | Discoloration level 4, staining level 3-4 | Discoloration level 4-5, staining level 3 | Discoloration level 4, staining level 4 |
| Example 6 | Black | Discoloration level 4, staining level 2-3 | Discoloration level 4-5, staining level 4-5 | Discoloration level 4-5, staining level 3 | Discoloration level 4-5, staining level 4-5 |

It can be seen from Table 4 that the inkjet inks prepared in Examples 1-6 of the present disclosure have high color fastness and extremely high color fixation rate, and thus, even if it is not washed with water, the color fastness of the fabric samples printed by the inkjet inks in Examples 1-6 is relatively high, the fabric samples can be used directly without washing, and can also meet the color fastness requirements of clothing when used directly. And, after being washed once with cold water, the color fastness of the inkjet inks in Examples 1-6 is better, and approximately 0.5 level of the water washing and wet rubbing fastness can be further increased. In contrast, the conventional K type reactive ink needs 4-8 times of water washing and soaping at high temperature after steaming, so as to obtain relatively high color fastness. Accordingly, the inkjet ink prepared in accordance with several embodiments of the present disclosure can be washed without water, and only needs a very small amount of water even if it is washed with water, which can save a large amount of consumption of water, electricity and steam and meet the requirements of environmental protection. For the patterns printed by the inkjet inks in Examples 1-6 of the present disclosure, almost all the unfixed dye can be removed after washed once with cold water, and there is almost no unfixed dye in the subsequent soaping process (washing with the soap solution at 95° C.); this demonstrates that the fabric printed by the inkjet ink according to the present disclosure does not need to be washed with water or only needs a very short water washing process to achieve satisfactory washing fastness. However, the conventional K type reactive ink requires a relatively long time and multiple steps of water washing-soaping processes. Therefore, compared with the conventional K type reactive ink, embodiments of the present disclosure have the advantages of saving time and saving water, electricity and steam, effectively.

Example 11 Performance Test—Storage Stability

The pH, surface tension, electrical conductivity and other indicators of six inkjet inks prepared in Examples 1-6 were tested, respectively. The pH values of the inkjet inks prepared in Examples 1-6 are shown in Table 5; the surface tension data is shown in Table 6, and the surface tension was tested with QBZY series automatic surface tensiometer; and the electrical conductivity data is shown in Table 7, and the electrical conductivity was tested with a METTLER TOLEDO LE703 conductivity meter.

TABLE 5 pH values of the inkjet ink

| Number | Color | Initial pH value | pH value at 1 month | pH value at 2 month | pH value at 3 month |
|---|---|---|---|---|---|
| Example 1 | Magenta | 7.82 | 7.34 | 7.16 | 7.09 |
| Example 2 | Yellow | 7.86 | 6.03 | 5.76 | 5.56 |
| Example 3 | Orange | 7.24 | 5.68 | 5.57 | 5.46 |
| Example 4 | Navy blue | 6.26 | 5.94 | 5.80 | 5.67 |

TABLE 5-continued pH values of the inkjet ink

| Number | Color | Initial pH value | pH value at 1 month | pH value at 2 month | pH value at 3 month |
|---|---|---|---|---|---|
| Example 5 | Royal blue | 7.28 | 5.88 | 5.61 | 5.45 |
| Example 6 | Black | 6.83 | 6.65 | 6.34 | 6.22 |

TABLE 6

Electrical conductivity data of the inkjet ink

| Number | Color | Initial electrical conductivity value (ms/cm) | Electrical conductivity value at 1 month (ms/cm) | Electrical conductivity value at 2 month (ms/cm) | Electrical conductivity value at 3 month (ms/cm) |
|---|---|---|---|---|---|
| Example 1 | Magenta | 5.30 | 5.35 | 5.40 | 5.45 |
| Example 2 | Yellow | 7.23 | 7.29 | 7.35 | 7.40 |
| Example 3 | Orange | 6.78 | 6.83 | 6.90 | 6.95 |
| Example 4 | Navy blue | 7.80 | 7.85 | 7.91 | 7.95 |
| Example 5 | Royal blue | 8.42 | 8.54 | 8.69 | 8.75 |
| Example 6 | Black | 8.75 | 8.80 | 8.88 | 8.90 |

TABLE 7

Surface tension data of the inkjet ink

| Number | Color | Initial surface tension value (mN/m) | Surface tension value at 1 month (mN/m) | Surface tension value at 2 month (mN/m) | Surface tension value at 3 month (mN/m) |
|---|---|---|---|---|---|
| Example 1 | Magenta | 33.5 | 33.5 | 33.6 | 33.6 |
| Example 2 | Yellow | 32.7 | 32.7 | 32.7 | 32.7 |
| Example 3 | Orange | 31.2 | 31.3 | 31.2 | 31.2 |
| Example 4 | Navy blue | 30.8 | 31.0 | 30.9 | 30.9 |
| Example 5 | Royal blue | 33.3 | 33.4 | 33.4 | 33.6 |
| Example 6 | Black | 29.7 | 29.7 | 29.8 | 29.8 |

It can be seen from Tables 5-7 that the electrical conductivity and surface tension of the inkjet inks prepared in Examples 1-6 barely changed within a storage period of 3 months, while the variation trend of pH values varied with the reactive dyes used. In these cases, the pH value of the inkjet ink which was royal blue in Example 5 decreased to 5.88 after 1 month of storage, and decreased to 5.45 after 3 months of storage. The pH stability of the magenta and black inks was high, and the pH value barely changed within the storage period of 3 months, and thus the usage period of the magenta and black inks can be set to more than 3 months. The pH value of the inks which were other colors decreased within the storage period of 3 months, but was still above 5.5, which was still in a safe range for a print nozzle, and thus the usage period of them can be set within 3 months.

The embodiments of the present disclosure have been described in details above, but the present disclosure is not limited to the above embodiments, various modifications can also be made within the scope of knowledge possessed by those skilled in the art, without departing from the purpose of the present disclosure. Furthermore, embodiments of the present disclosure and features in the embodiments may be combined with each other in the absence of conflicts.

The examples set forth above are provided to give those of ordinary skill in the art a complete disclosure and description of how to make and use the embodiments of the inkjet ink, materials, compositions, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. The webpages referred in the instant disclosure are the webpages available at the filing date of the present disclosure as will be understood by a skilled person.

It is to be understood that the disclosures are not limited to particular compositions materials, or biological systems, which can, of course, vary. It is also to be understood that the terminology used herein is for the purpose of describing particular embodiments only, and is not intended to be limiting. As used in this specification and the appended claims, the singular forms “a,” “an,” and “the” include plural referents unless the content clearly dictates otherwise. The term “plurality” includes two or more referents unless the content clearly dictates otherwise. Unless defined otherwise, all technical and scientific terms used herein have the same meaning as commonly understood by one of ordinary skill in the art to which the disclosure pertains.

Unless otherwise indicated, the disclosure is not limited to specific reactants, substituents, catalysts, reaction conditions, or the like, as such may vary. It is also to be understood that the terminology used herein is for the purpose of describing particular embodiments only and is not intended to be limiting.

As used in the specification and the appended claims, the singular forms “a,” “an,” and “the” include plural referents unless the context clearly dictates otherwise. Thus, for example, reference to “a dye” includes a single dye as well as a combination or mixture of two or more dye, reference to “a substituent” encompasses a single substituent as well as two or more substituents, and the like.

As used in the specification and the appended claims, the terms “for example,” “for instance,” “such as,” or “including” are meant to introduce examples that further clarify more general subject matter. Unless otherwise specified, these examples are provided only as an aid for understanding the applications illustrated in the present disclosure, and are not meant to be limiting in any fashion.

In this disclosure and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 10 carbon atoms, preferably 1 to about 6 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 6 carbon atoms. The term "cycloalkyl" intends a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "heteroatom-containing" as in a "heteroatom-containing alky group" refers to a alkyl group in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. In some embodiments, alkaryl and aralkyl groups contain 6 to 24 carbon atoms, and particularly alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl, and "aralkyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The terms "halo" and "halogen" are used in the conventional sense to refer to a chloro, bromo, fluoro or iodo substituent.

The term "polyether" as used herein indicates a structure containing multiple carbon-oxygen-carbon covalent linkages.

The term "olefins" as used herein indicates two carbons covalently bound to one another that contain a double bond ($sp^2$-hybridized bond) between them. The other functional groups bound to each of these two carbons can be additional carbons, hydrogen atoms, or heteroatoms.

By "substituted" as in "substituted alkyl," "substituted aryl," and the like, as alluded to in some of the aforementioned definitions, is meant that in the alkyl, aryl, or other moiety, at least one hydrogen atom bound to a carbon (or other) atom is replaced with one or more non-hydrogen substituents.

Examples of such substituents include, without limitation: functional groups such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—$COO^-$), carbamoyl (—(CO)—$NH_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl),N—($C_5$-$C_{24}$ aryl)-substituted carbamoyl, thiocarbamoyl (—(CS)—$NH_2$), mono-($C_1$-$C_{24}$ alkyl)-substituted thiocarbamoyl (—(CO)—NH($C_1$-$C_{24}$ alkyl)), di-($C_1$-$C_{24}$ alkyl)-substituted thiocarbamoyl (—(CO)—N($C_1$-$C_{24}$ alkyl)$_2$), mono-($C_5$-$C_{24}$ aryl)-substituted thiocarbamoyl (—(CO)—NH-aryl), di-($C_5$-$C_{24}$ aryl)-substituted thiocarbamoyl (—(CO)—N($C_5$-$C_{24}$ aryl)$_2$), di-N—($C_1$-$C_{24}$ alkyl),N—($C_5$-$C_{24}$ aryl)-substituted thiocarbamoyl, carbamido (—NH—(CO)—$NH_2$), cyano(—C≡N), cyanato (—O—C≡N), thiocyanato (—S—C≡N), formyl (—(CO)—H), thioformyl (—(CS)—H), amino (—$NH_2$), mono-($C_1$-$C_{24}$ alkyl)-substituted amino, di-($C_1$-$C_{24}$ alkyl)-substituted amino, mono-($C_5$-$C_{24}$ aryl)-substituted amino, di-($C_5$-$C_{24}$ aryl)-substituted amino, $C_2$-$C_{24}$ alkylamido (—NH—(CO)-alkyl), $C_6$-$C_{24}$ arylamido (—NH—(CO)-aryl), imino (—CR═NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR═N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR═N(aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—$NO_2$), nitroso (—NO), sulfo (—$SO_2$—OH), sulfonato (—$SO_2$—$O^-$), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—$SO_2$-alkyl), $C_5$-$C_{24}$ arylsulfonyl (—$SO_2$-aryl), boryl (—$BH_2$), borono (—B(OH)$_2$), boronato (—B(OR)$_2$ where R is alkyl or other hydrocarbyl), phosphono (—P(O)(OH)$_2$), phosphonato (—P(O)($O^-$)$_2$), phosphinato (—P(O)($O^-$)), phospho (—$PO_2$), phosphino (—$PH_2$), silyl (—$SiR_3$ wherein R is hydrogen or hydrocarbyl), and silyloxy (—O-silyl); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

The term "distal" as used herein indicates substitution in the para-position (aryl rings), or at the farthest possible point of attachment from the point of origin (cyclic alkyl ring).

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

In the molecular structures herein, the use of bold and dashed lines to denote particular conformation of groups follows the IUPAC convention. A bond indicated by a broken line indicates that the group in question is below the general plane of the molecule as drawn, and a bond indicated by a bold line indicates that the group at the position in question is above the general plane of the molecule as drawn.

The term "carbon chain" as used herein indicates a linear or branched line of connected carbon atoms.

Although any methods and materials similar or equivalent to those described herein can be used in the practice for testing of the specific examples, additional appropriate materials and methods are described herein.

A number of embodiments of the disclosure have been described. Nevertheless, it will be understood that various modifications may be made without departing from the spirit and scope of the present disclosure. Accordingly, other embodiments are within the scope of the following claims.

REFERENCES

1. ADDIN EN.REFLIST Wikipedia-acid-regulator (2022). "Acidity Regulator." from webpage en(dot) wikipedia(dot)org/wiki/Acidity_regulator
2. Wikipedia-antimicrobial (2022). "Antimicrobial." from webpage en(dot)wikipedia(dot)org/wiki/Antimicrobial
3. Wikipedia-chelation (2022). "Chelation." from webpage en(dot)wikipedia(dot)org/wiki/Chelation
4. Wikipedia-defoamer (2022). "Defoamer." from webpage en(dot)wikipedia(dot)org/wiki/Defoamer
5. Wikipedia-dye (2022). "Dye." from webpage en(dot) wikipedia(dot)org/wiki/Dye
6. Wikipedia-dyeing (2022). "Dyeing." from webpage en(dot)wikipedia(dot)org/wiki/Dyeing
7. Wikipedia-ink (2022). "Ink." from webpage en(dot) wikipedia(dot)org/wiki/Ink
8. Wikipedia-pigment (2022). "Pigment." from webpage en(dot)wikipedia(dot)org/wiki/Pigment
9. Wikipedia-polyol (2022). "Polyol." from webpage en(dot)wikipedia(dot)org/wiki/Polyol
10. Wikipedia-reactive-dye (2022). "Reactive dye." from webpage en(dot)wikipedia(dot)org/wiki/Reactive_dye
11. Wikipedia-solvent (2022). "Solvent." from webpage en(dot)wikipedia(dot)org/wiki/Solvent
12. Wikipedia-textile-printing (2022). "Textile printing." from webpage en(dot)wikipedia(dot)org/wiki/Textile-_printing.
13. Wikipedia-textile (2022). "Textile." from webpage en(dot)wikipedia(dot)org/wiki/Textile
14. Wikipedia-wetting (2022). "Wetting." from webpage en(dot)wikipedia(dot)org/wiki/Wetting

The invention claimed is:

1. An inkjet ink, comprising, in mass percentage:

5%-15% of a reactive dye, comprising at least one reactive group selected from the group consisting of a haloheterocycle reactive group and an activated double bond reactive group;

20%-30% of a polyol, wherein the polyol is selected from the group consisting of a diol, a triol, a tetrol, and a polyether polyol;

2%-15% of an auxiliary agent; and water.

2. The inkjet ink of claim 1, wherein the reactive dye has formula (I), $D-L_n-G_m$(I)

wherein D refers to a dye moiety, G refers to a reactive group, m refers to the number of reactive groups and ranges from 2 to 5, L refers to a linker covalently connected to the dye moiety and the reactive groups, n ranges from 0 to 1, wherein number of unique reactive groups G ranges from 1 to m.

3. The inkjet ink according to claim 1, wherein the reactive dye is selected from at least one of a dye with bifunctional reactive groups and a dye with trifunctional reactive groups.

4. The inkjet ink according to claim 3, wherein the reactive dye with bifunctional reactive groups is selected from at least one of divinyl sulfone type reactive dye, reactive dye prepared by monochloro-s-triazine compounded with vinyl sulfone, reactive dye prepared by monofluoro-s-triazine compounded with vinyl sulfone, reactive dye prepared by monochloro-s-triazine compounded with fluoro-chloro-pyrimidine, and reactive dye prepared by monofluoro-s-triazine compounded with fluoro-chloro-pyrimidine.

5. The inkjet ink according to claim 3, wherein the reactive dye with trifunctional reactive groups is a dye comprising trifunctional reactive groups, wherein the active group is selected from at least one of monochloro-s-triazine group, monofluoro-s-triazine group, vinyl sulfone group, and fluoro-chloro-pyrimidine group.

6. The inkjet ink according to claim 1, wherein the auxiliary agent is selected from at least one of a cosolvent, a wetting agent, a chelating agent, a pH regulator, an antifoaming agent, a leveling agent, and an antibacterial agent.

7. The inkjet ink according to claim 6, based on the total mass of the inkjet ink, the mass percentage of the cosolvent is 0.1%-5%, the mass percentage of the wetting agent is 1%-5%, the mass percentage of the chelating agent is 0.005%-0.2%, the mass percentage of the pH regulator is 0.005%-1%, the mass percentage of the antifoaming agent is 0.005%-2%, the mass percentage of the antibacterial agent is 0.01%-1%, and the mass percentage of the leveling agent is 0.01%-0.1%.

8. The inkjet ink according to claim 7, wherein the chelating agent is selected from at one of least ethylenediamine tetraacetic acid, ethylenebis(nitrilodimethylene)tetraphosphonic acid, etidronic acid, citric acid, and maleic acid.

9. The inkjet ink according to claim 1, wherein the inkjet ink is a digital inkjet ink.

10. A method for preparing an inkjet ink according to claim 1, the method comprising:

providing raw materials comprising a reactive dye selected from at least one of a dye with bifunctional reactive groups and a dye with trifunctional reactive groups, polyol, and auxiliary agent, and water, wherein the reactive dye comprises at least one reactive group selected from the group consisting of a haloheterocycle reactive group and an activated double bond reactive group, the method further comprising mixing the raw materials, to prepare and obtain the inkjet ink of claim 1.

11. A method of using the inkjet ink according to claim 1 in fabrics printing and dyeing, the method comprising steps of:

performing pretreatment on a fabric with a primer;

printing and dyeing the inkjet ink of claim 1 onto the fabric; and steaming.

12. The method according to claim 11, wherein a steaming time is 1-5 mins.

* * * * *